United States Patent
Botterbrodt et al.

(10) Patent No.: US 9,606,018 B2
(45) Date of Patent: Mar. 28, 2017

(54) DEVICE FOR DETECTING LEAKS IN PACKAGES

(71) Applicant: ABBOTT LABORATORIES, Abbott Park, IL (US)

(72) Inventors: Kenneth William Botterbrodt, Marlton, NJ (US); David Carl Ulstad, Dublin, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 287 days.

(21) Appl. No.: 14/363,999

(22) PCT Filed: Jan. 3, 2013

(86) PCT No.: PCT/US2013/020038
§ 371 (c)(1),
(2) Date: Jun. 9, 2014

(87) PCT Pub. No.: WO2013/103649
PCT Pub. Date: Jul. 11, 2013

(65) Prior Publication Data
US 2014/0352409 A1 Dec. 4, 2014

Related U.S. Application Data

(60) Provisional application No. 61/582,608, filed on Jan. 3, 2012.

(51) Int. Cl.
*G01M 3/34* (2006.01)
*G01M 3/40* (2006.01)
(Continued)

(52) U.S. Cl.
CPC .............. *G01M 3/40* (2013.01); *G01M 3/02* (2013.01); *G01M 3/16* (2013.01); *G01M 3/187* (2013.01)

(58) Field of Classification Search
USPC .................................................. 73/40, 49.3
See application file for complete search history.

(56) References Cited

U.S. PATENT DOCUMENTS

| | | | | |
|---|---|---|---|---|
| 4,803,868 A | * | 2/1989 | Vinton | G01M 3/363 73/49.3 |
| 5,760,295 A | * | 6/1998 | Yasumoto | G01M 3/40 73/49.3 |
| 2003/0033857 A1 | * | 2/2003 | Franks | G01M 3/34 73/49.3 |

FOREIGN PATENT DOCUMENTS

| | | |
|---|---|---|
| JP | 2269933 | 11/1990 |
| JP | 2008039464 | 2/2008 |

(Continued)

OTHER PUBLICATIONS

International Search Report and Written Opinion from PCT/US2013/020038 mailed Mar. 20, 2013.
(Continued)

*Primary Examiner* — Clayton E Laballe
*Assistant Examiner* — Warren K Fenwick
(74) *Attorney, Agent, or Firm* — Calfee, Halter & Griswold LLP

(57) ABSTRACT

A device for detecting leaks or weaknesses in a flexible package. The device includes a first member having a non-conductive surface, a second member secured in a position adjacent the first member, and a control system. The second member has an electrically conductive first portion and an electrically conductive second portion. The electrically conductive first portion of the second member is normally electrically insulated from the electrically conductive second portion of the second member. The control system is arranged to detect an electrical current between the electrically conductive first portion and the electrically conductive second portion. The second member may be posi-
(Continued)

tioned relative the first member to compress a flexible package between the first member and the second member.

20 Claims, 10 Drawing Sheets

(51) Int. Cl.
*G01M 3/18* (2006.01)
*G01M 3/02* (2006.01)
*G01M 3/16* (2006.01)

(56) References Cited

FOREIGN PATENT DOCUMENTS

JP  20081288828  6/2008
WO  95/14915  6/1995

OTHER PUBLICATIONS

Interational Preliminary Report on Patentability from PCT/US2013/020038 issued Jul. 8, 2014.
Communication Pursuant to Rules 161(1) and 162 EPC from European Application No. 13703166.2 mailed Aug. 12, 2014.

* cited by examiner

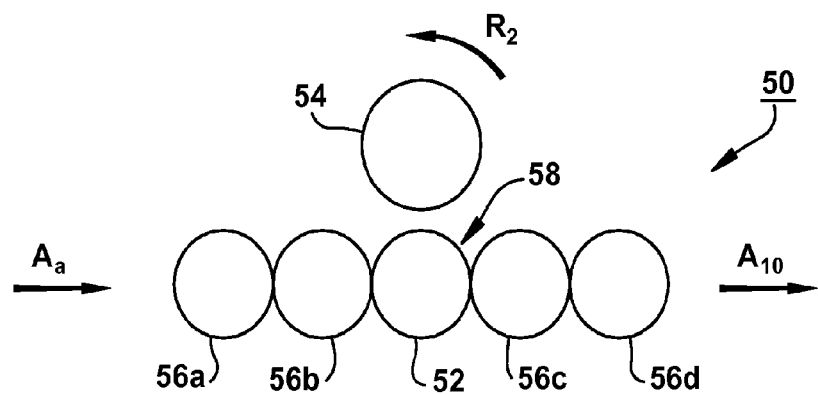
Figure 4
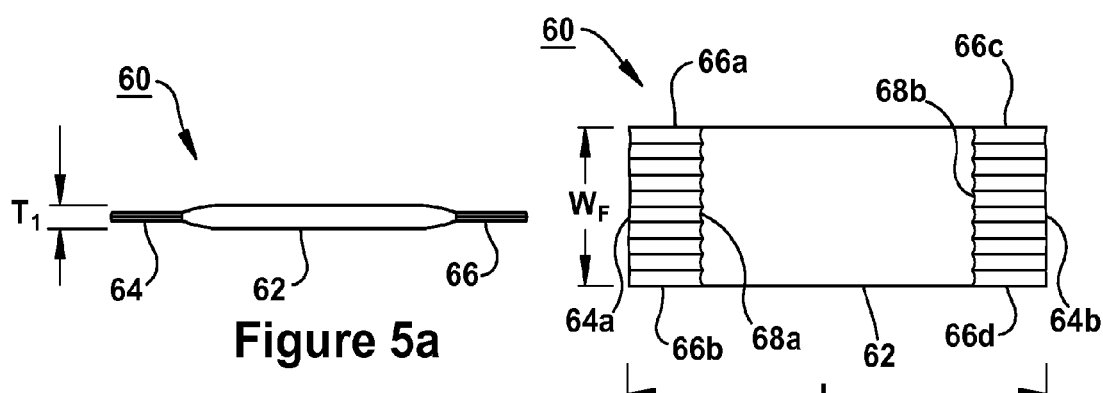
Figure 5a
Figure 5b

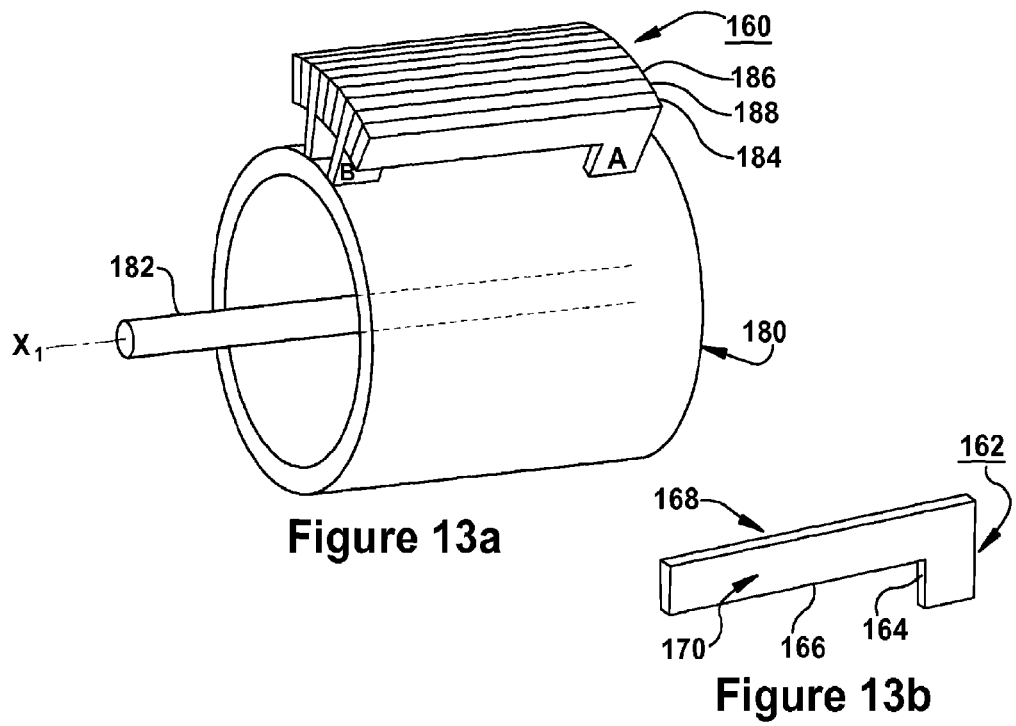
Figure 13a
Figure 13b
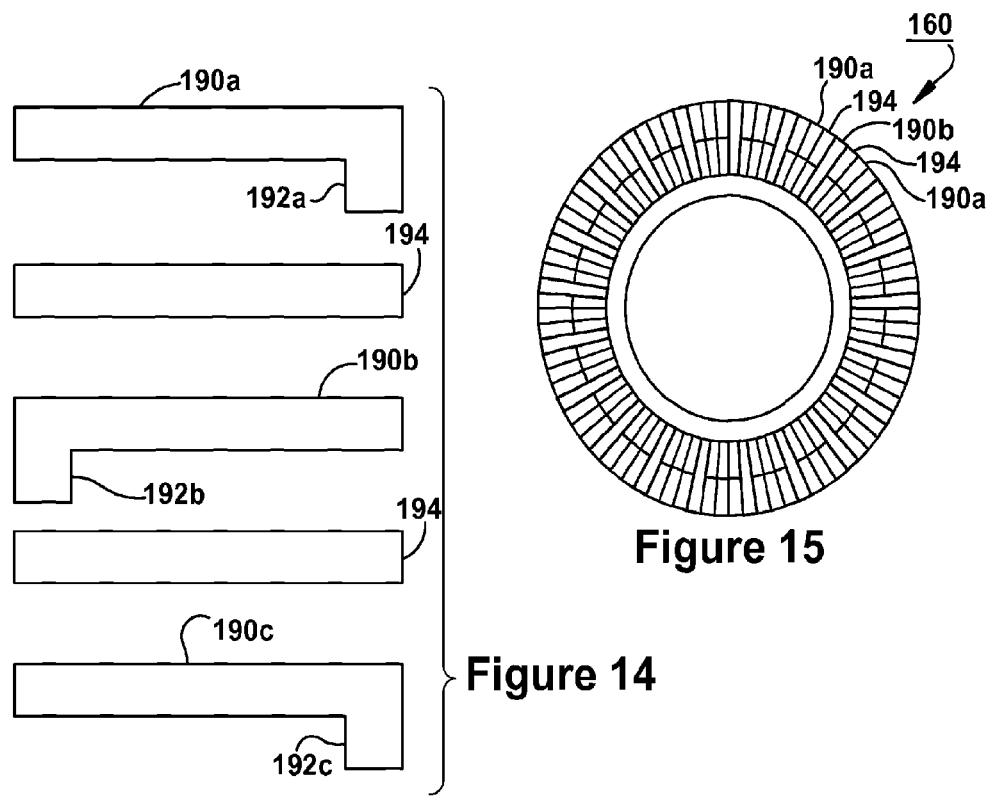
Figure 14
Figure 15

DEVICE FOR DETECTING LEAKS IN PACKAGES

CROSS REFERENCE TO RELATED APPLICATIONS

This application is the U.S. national stage entry of PCT/US2013/020038, with an international filing date of 3 Jan. 2013, which is herein incorporated by reference in its entirety and which claims priority to and any other benefit of U.S. Provisional Application Ser. No. 61/582,608, with a filing date of 3 Jan. 2012, which is herein incorporated by reference in its entirety.

BACKGROUND

A manufacturer of industrial or consumer products faces many production challenges. For example, many products require testing after a package is filled and sealed. The specific physical and chemical characteristics of the product, and the type of packaging selected, often govern the frequency and method of testing.

One type of product package is a flexible container, such as a bag, pouch or packet. Flexible containers are used to package many types of goods, including industrial products, such as liquids, gels and powders, and consumer products, such as condiments, health additives and drink flavorings. This type of product package allows movement of the walls of the flexible container after packaging, during subsequent manufacturing steps, in transport to the point-of-sale location, and up to the time of use. However, a leak in one or more packages may cause expensive delays during manufacturing, subsequent inventory issues, or even a product recall. A leak may also jeopardize any sterile or sanitary properties of the packaged material.

SUMMARY

The present application describes a device for detecting leaks or weakness in a product package. The package may be a flexible package containing an electrically conductive material.

In an exemplary embodiment, the device includes a first member having a non-conductive surface, a second member secured in a position adjacent the first member, and a control system. The second member has an electrically conductive first portion and an electrically conductive second portion. The electrically conductive first portion of the second member is normally electrically insulated from the electrically conductive second portion of second member. The control system may be arranged to detect an electrical current between the electrically conductive first portion and the electrically conductive second portion.

BRIEF DESCRIPTION OF THE DRAWINGS

Features and advantages of the general inventive concepts will become apparent from the following detailed description made with reference to the accompanying drawings.

FIG. 4 is a schematic view of another exemplary leak detection device, the device shown in an application for horizontal travel of the packages;

FIG. 5a is a perspective view of a flexible package;

FIG. 5b is a top view of the flexible package of FIG. 5a;

FIG. 13a is a perspective view of another exemplary roller of a leak detection device, shown with portions of the roller removed for clarity;

FIG. 13b is a front perspective view of an exemplary conductor plate of FIG. 13a;

FIG. 14 is a front partial assembly view of the roller of FIG. 13a; and

FIG. 15 is a side view of the roller of FIG. 13a.

DETAILED DESCRIPTION

Figure 1:
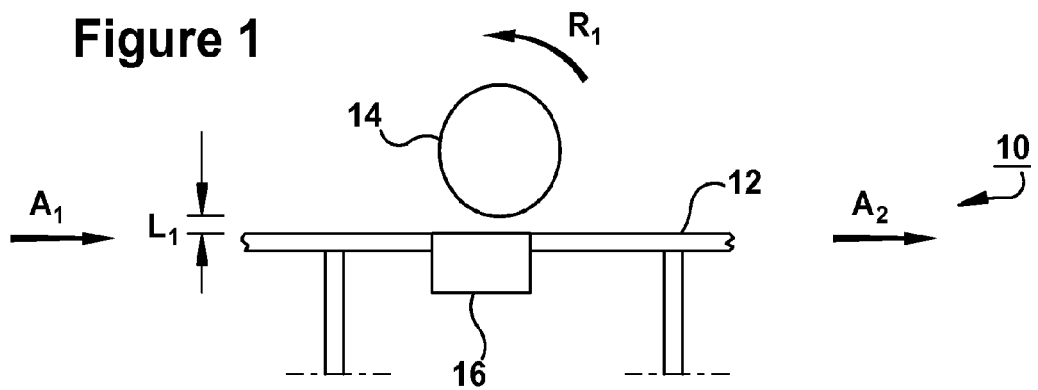
FIG. 1 is a side view of an exemplary device for detecting leaks in a package, the device shown in an application suitable for horizontal travel of the package.

This Detailed Description merely describes exemplary embodiments in accordance with the general inventive concepts and is not intended to limit the scope of the invention or the claims in any way. Indeed, the invention as described by the claims is broader than and unlimited by the exemplary embodiments set forth herein, and the terms used in the claims have their full ordinary meaning.

The general inventive concepts will now be described with occasional reference to the exemplary embodiments of the invention. This general inventive concept may, however, be embodied in different forms and should not be construed as limited to the embodiments set forth herein. Rather, these embodiments are provided so that this disclosure will be thorough and complete, and will fully convey the scope of the general inventive concepts to those skilled in the art.

Unless otherwise defined, all technical and scientific terms used herein have the same meaning as commonly understood by one of ordinary skill in the art encompassing the general inventive concepts. The terminology set forth in this detailed description is for describing particular embodiments only and is not intended to be limiting of the general inventive concepts. As used in this detailed description and the appended claims, the singular forms "a," "an," and "the" are intended to include the plural forms as well, unless the context clearly indicates otherwise.

Unless otherwise indicated, all numbers expressing quantities of ingredients, properties such as molecular pressure source, reaction conditions, and so forth as used in the specification and claims are to be understood as being modified in all instances by the term "about." Accordingly, unless otherwise indicated, the numerical properties set forth in the specification and claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

The present application describes, in part, a device for detecting leaks or weaknesses in a package. The package may be a flexible package containing an electrically conductive material, such as for example, a human consumable product. An exemplary electrically conductive material for human consumption is a breast milk additive. However, use of the inventive device is not limited to packages containing human consumable products, or to any other type of package typically containing an electrically conductive material. For example, the device may also be used to test packages which typically may not include an electrically conductive material, such as for example, an electrically insulating gel. However, for the general purposes of evaluating the quality of a particular packaging, most likely the packaging or packages are filled and sealed with an electrically conductive test material.

The inventive device may be used within a production line having multiple pieces of equipment, and may be used in series with another leak detection device. For example, conventional testing methods and apparatus exist for detecting small leaks in certain flexible packaging. Apparatus of this type are more suited for detecting leaks on the microscopic level, rather than gross leaks or actual breaks in the packaging. Also, gross leaks may soil or damage microscopic detection apparatus. To prohibit this type of damage to expensive test equipment, the inventive device can be disposed in a position to detect leaks in an upstream location.

The inventive device has a first member, a second member and a control system. In an exemplary embodiment, the first member and the second member are shaped and arranged to allow a flexible package to be positioned between the members. Movement of one or both of the members compresses the flexible package in operation of the device. The control system is arranged to detect an electrical current during operation of the device. An electrical current between pre-determined portions of the device gives a user an indication of a leak within the flexible package, i.e., an electrical current is flowing through electrical conductive material that has been compressed out of the flexible package.

The first member has a non-conductive surface. In an exemplary embodiment, the non-conductive surface contacts the flexible package during operation of the device. The second member is secured in a position adjacent the first member and has an electrically conductive first portion and an electrically conductive second portion. For example, the second member may be contiguous with the first member, or may be positioned close to the first member, such as for example, within the width of a flexible package to be tested. The second member may be counterbalanced, such as for example, against gravity, in a position adjacent the first member. It should be understood that the first member and the second member can be arranged relative to each other in still other positions in the practice of this invention.

The first member and the second member may be the same type or a different type of object. For example, the first member may be, for example, a conveyor, a conveyer belt, a roller, or a plate. The second member may be, for example, a roller or a plate. In operation of an inventive device, the first member and the second member may be orientated in any relative relationship in which movement of the first member and/or the second member compresses the flexible package under test.

The characteristics of the device may vary so as to allow operation in a variety of environments, such as for example, a high-speed production line. The relative orientation of the first member and the second member may permit testing of the flexible package while the package is in motion, such as for example, on a conveyer system, with the first member being a insulated belt, such as a rubber belt, and the second member being a roller. In operation, the roller may ride over the outer surface of the flexible package. Therefore, during compression, the first member, the second member, and the first package are in motion. Alternatively, the relative orientation of the first member and the second member may permit testing of the flexible package while the package is not in motion, such as for example, on a compression plate system, with the first member being an insulated plate, and the second member being a conductive plate. During compression, either one of the plates, or both of the plates, may move, and the flexible package is not in motion.

As discussed, the second member has an electrically conductive first portion and an electrically conductive second portion. The first portion may be a first set of individual parts, such as for example, distinct pieces of an object, such as for example, a plate or roller, and the second portion a second set of individual parts, such as for example, distinct pieces of the same plate or the same roller. The electrically conductive first portion of the second member is normally electrically insulated from the electrically conductive second portion of second member.

The control system is arranged to detect an electrical current between the electrically conductive first portion and the electrically conductive second portion. An electrical current between the electrically conductive first portion and the electrically conductive second portion will flow through an electrically conductive material that has been forced out of a flexible package by compression of the flexible package between the first member and the second member.

Figure 2:
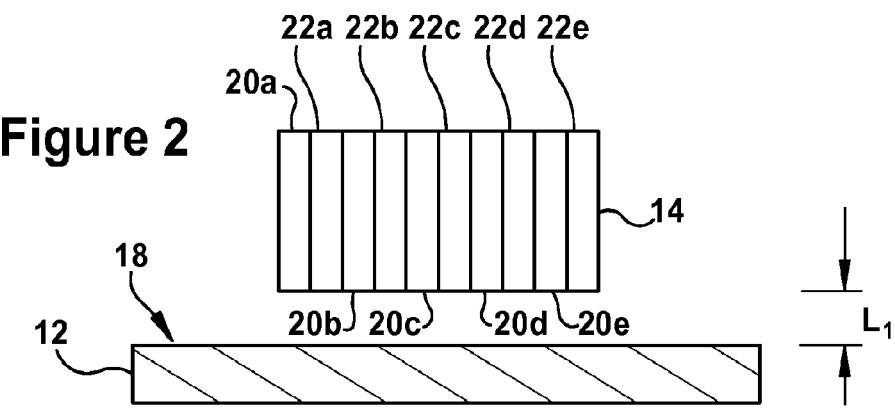
FIG. 2 is a front side view of the device of FIG. 1.

Referring now to the drawings, an exemplary embodiment of a device 10 for detecting leaks in a flexible package is illustrated in FIGS. 1 and 2. A side view is shown in FIG. 1, i.e., in this orientation flexible packages travel along a horizontal path, entering the device in a direction $A_1$ and exiting the device in a direction $A_2$. A front view of the device 10 is shown in FIG. 2. Other orientations for the device, and other travel paths for the flexible device are possible in the practice of this invention, such as for example, a vertical travel path or a gradual incline or a gradual descent. For example, a downward travel path is shown in FIG. 3.

The device shown in FIG. 1 includes a first member 12, a second member 14, and a control system 16. In the illustrated exemplary embodiment, the first member is a moving conveyer 12 upon which flexible packages enter the device 10 in a direction $A_1$ and exit the device 10 in a direction $A_2$. The conveyer 12 generally has a non-conductive top surface 18 (see FIG. 2) and may include a non-conductive belt, such as for example, a rubber belt, upon which each of the flexible packages rests during operation of the device. The second member is a roller 14 under which a flexible package may pass. The roller 14 is positioned relative the conveyor 12 to compress a flexible package between the roller 14 and the conveyer 12 as the flexible package travels through the device 10. As shown, the roller 14 is positioned a distance $L_1$ above the conveyor 12. The distance $L_1$ is generally no more than the thickness of a flexible package under test, and can be less than the thickness of the flexible package, and the roller and the conveyor can be touching in between passes of individual flexible packages. As shown, the roller 14 rotates a direction $R_1$ and rides upon the outer surface of a flexible package during passage of a flexible package.

The roller 14 generally has an electrically conductive first portion and an electrically conductive second portion. In the exemplary roller 14 shown (see FIG. 2), the first portion includes a first set of individual plates 20a, 20b, 20c, 20d, 20e and the second portion includes a second set of individual plates 22a, 22b, 22c, 22d, 22e. Each plate is constructed from an electrically conductive material, such as for example, stainless steel, and each of the first set of electrically conductive plates is electrically insulated from each of the second set of electrically conductive plates. The plates may be insulated from each other by any suitable method, including for example, insulating plates or insulating adhesive comprised of any known materials that are electrically insulating or non-conductive. Examples of such known insulating materials are plastics and rubbers. In the practice of the invention, other types of detection rollers and other types of conveyers may be used, and the rollers and conveyers may be positioned and orientated differently, and may be positioned and orientated to accommodate different flexible package travel paths and different flexible package directions.

Figure 3:
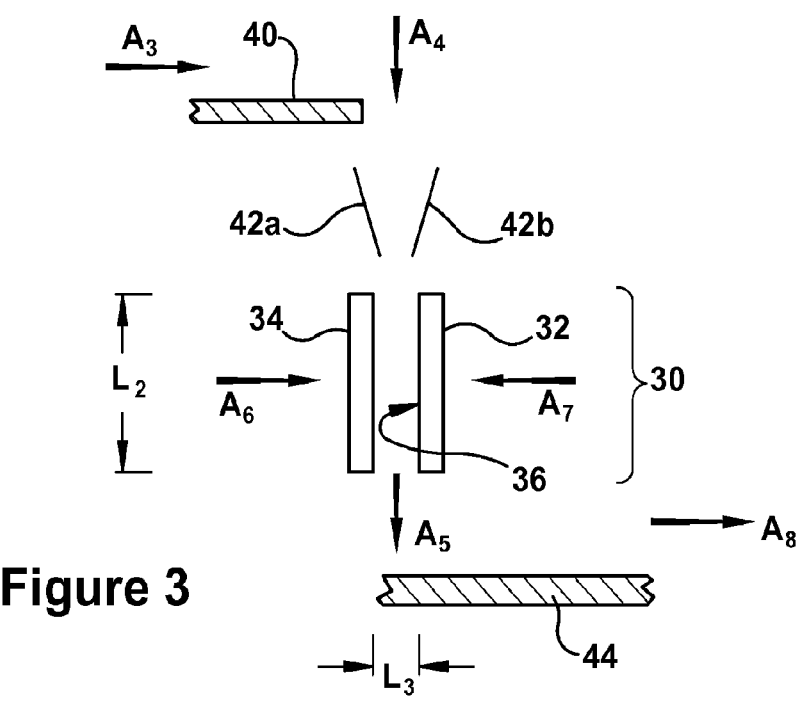
FIG. 3 is a side view of another exemplary leak detection device, the device shown in an application suitable for vertical travel of the package.

FIGS. 3 and 4 illustrate several other exemplary embodiments of the invention. FIG. 3 is a side view of an exemplary leak detection device 30 shown in an application intended for vertical or downward travel of the flexible packages. The device includes a first member, or first plate 32, with a non-conductive surface 36, and a second member, or second plate, or detection plate 34. The detection plate may include two or more smaller plates which form a first portion and a second portion of the detection plate. As shown, a flexible package being tested by the device 30 will travel horizontally along a first conveyer 40 in a direction $A_3$, fall off the conveyer in a downward direction $A_4$ between a pair of slides 42a, 42b, and then between the plates 32, 34. The flexible package may be "caught" by inward movement of one or both of the plates, or the fall of the flexible package may be slowed or stopped between the plates, such as for example, by upwardly directed and timed delivery of compressed air. After compression, a flexible package falls in a downward direction $A_5$ and onto a second conveyer 44 and travels horizontally away from the device 30 in a direction $A_8$. In the practice of the invention, other entrance travel paths and directions and other exit travel paths and directions may be used.

The plates 32, 34 are sized and positioned to test a flexible package for leaks. Specifically, the plates are a length $L_2$ and positioned apart a distance $L_3$. The length of each plate $L_2$ may be longer than a length of the flexible package, or if shorter than the length of the flexible package, the control system (not shown) may permit multiple compressions of a flexible package during travel through the device 30, so as to test all portions of the flexible package. The distance $L_3$ the plates 32, 34 are normally apart will generally accommodate the thickness of a flexible package to be tested.

Generally, a flexible package is at rest during compression between the two plates 32, 34. As discussed, the compression forces upon the flexible package may be generated by either plate, or by both plates. As shown in FIG. 3, the first plate 32 may move in an inward direction $A_7$ with the detection plate 34 simultaneously in motion in an inward direction $A_6$, or only one plate may move inward with the other plate at rest.

FIG. 4 is a schematic of an exemplary leak detection device 50 shown in an application intended for horizontal travel of a flexible package. The device includes a first member, or first roller 52, with a non-conductive surface 58, and a second member, or detection roller 54. Detection roller 54 is made of similar construction as detection roll 14 in FIG. 1. As shown, a flexible package being tested by the device 50 will travel horizontally along a conveyer including a series of rollers 56a, 56b, 52, 56c, 56c in a direction $A_9$ toward the detection roller 54. The roller 52 rotates a direction $R_2$ and rides upon the outer surface of a flexible package during passage of a flexible package. After compression, a flexible package continues on the conveyer and travels horizontally away from the device 50 in a direction $A_{10}$. In the practice of the invention, other entrance travel paths and directions and other exit travel paths and directions may be used.

Prior to entering the device, the flexible package has been generally filled with an electrically conductive material and sealed. A flexible package to be tested may be one of many types, such as for example, a bag, pouch, packet or paper container, i.e., any package having one of more flexible walls or sections. The package may contain various types of materials, such as for example, a liquid, powder or gel. An exemplary package 60 is illustrated in FIGS. 5a and 5b. The exemplary package 60 is a typical container used for condiments or drink additives in the food industry. The package 60 includes a body portion 62 filled with contents, and two sealed portions 64, 66 on either end. The flexible package 60 defines a thickness $T_F$ which, as discussed herein, the device will normally accommodate. For example, the thickness $T_F$ is generally greater than the distance $L_1$ of the roller 14 above the conveyer 12 in normal non-compression conditions (see FIGS. 1 and 2), but one or both of the roller and conveyer will adjust to allow passage of the flexible package. Similarly, $T_F$ is generally greater than the distance between first and second members in any of the embodiments of the invention. Further, the flexible package 60 defines a length $L_F$ which, as discussed herein, the device will accommodate. For example, the length $L_F$ is generally less than the length $L_2$ of the detection plate 34 (see FIG. 3).

During the compression test, a flexible package may leak at one or more points of weakness, such as for example, at an improperly sealed location or at a hole in the body portion 62. For example, locations of leaking may be on the cut lines 64a, 64b of either laminated seal or at the outer edges 66a, 66b, 66c, 66d of the seal, or at inner seal edges 68a, 68b. The flexible package 60 and the discussed locations are for example only and in the practice of the invention, leaks may be detected at other locations of this flexible package, and at the same or other locations on flexible packages of other types, shapes, sizes or styles.

Figure 5C:
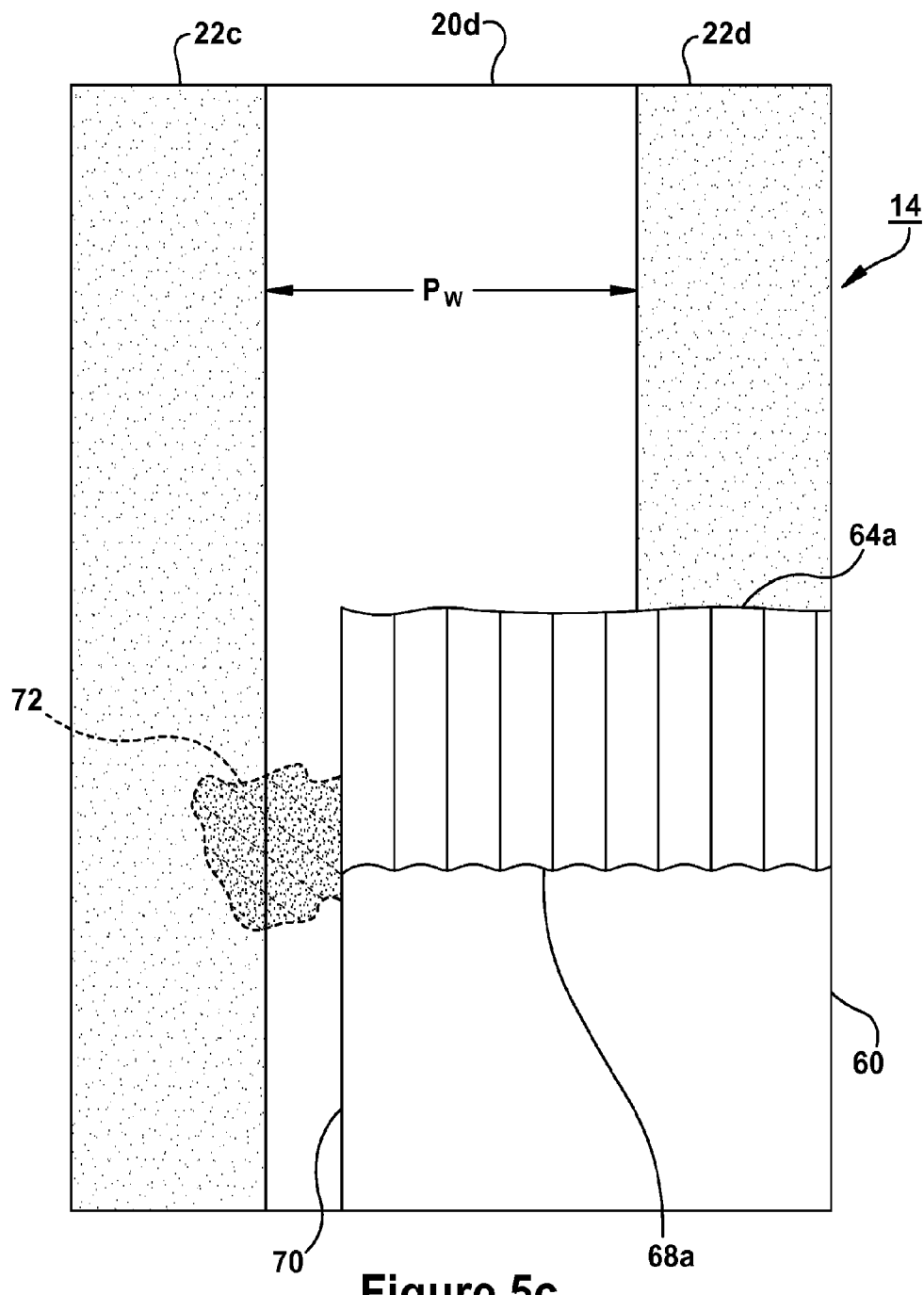
FIG. 5c is a front enlarged partial view of the roller of FIG. 1, shown in contact with electrically conductive material.

An example of a positive compression test is shown in FIG. 5c. Portions of three plates of the roller 14 of FIGS. 1 and 2 is shown in an enlarged view. The middle plate 20d is electrically insulated from the two plates 22c, 22d on either side. The middle plate 20d has a width $P_w$, which is generally less than the width $W_F$ of the flexible container 60. As shown, a leak has occurred during compression through a longitudinal edge 70 of the flexible package 60, and an amount 72 of the electrically conductive contents has leaked. The amount 72 spans over a portion of two adjacent plates 20d, 22c. In this illustrated test result, a control system (not shown) detects an electrical current between the electrically conductive first portion 20d of the roller 14 and the electrically conductive second portion 22c. The control system generally includes components necessary to detect an electrical current above a predetermined amount, and generate a signal to the user that an electrical current has been detected. It should be understood by one skilled in the art that any suitable components or combination of components may be used. This test result is for example only, and other positive test results could occur with leaks at other locations of the flexible container, and with one or more amounts of leaked material disposed at other locations on the roller.

Figure 6:
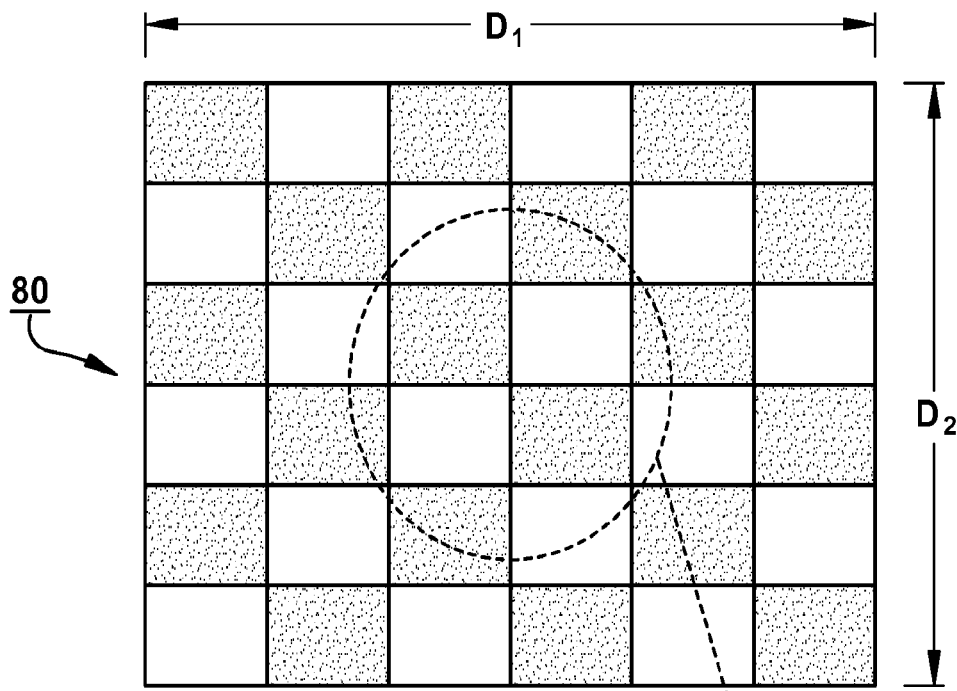
FIG. 6 is a front view of an exemplary detection plate of a leak detection device.

A second member of the device may be shaped in any suitable manner, and may also be divided between a electrically conductive first portion and an electrically conductive second portion in any suitable manner. An exemplary second member of a leak detection device is shown in FIG. 6. The second member is a detection plate 80 and is formed by two sets of individual plates, a first set of individual parts electrically insulated from a second set of individual parts. The plates are alternatively arranged in a "checkerboard" fashion as shown in FIG. 6. Each set of individual plates are electrically connected by any conventional method, such as wiring and a circuit board (not shown). The dimensions $D_1$, $D_2$ of the detection plate 80 generally accommodate the size of a flexible package to be tested, as discussed herein.

Figure 7:
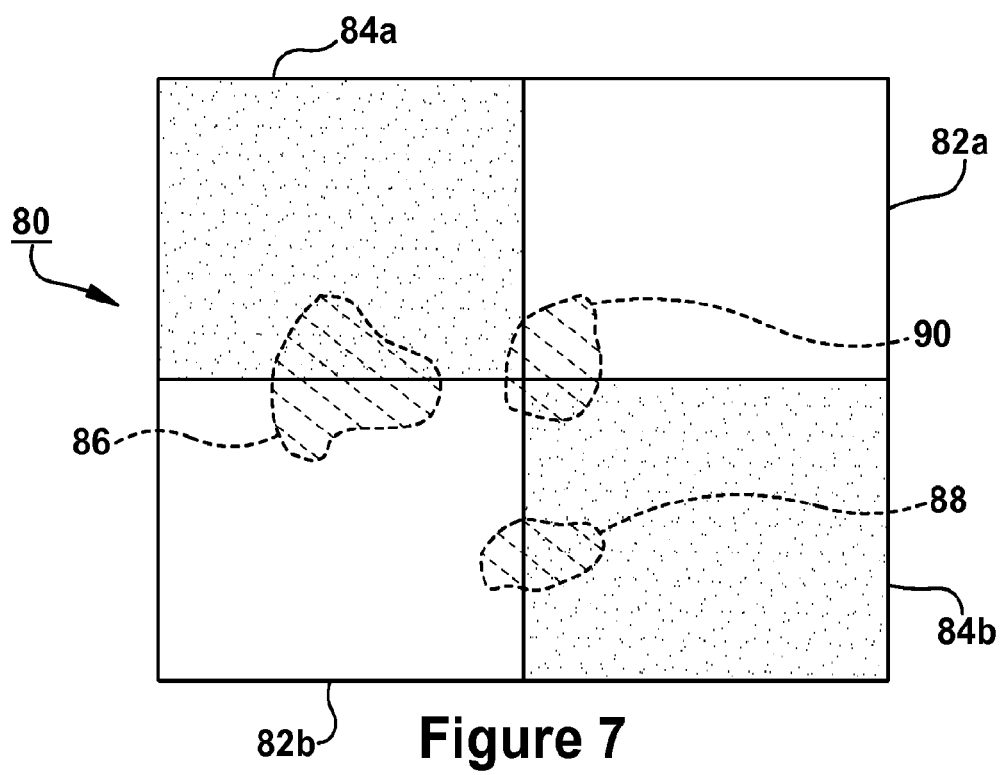
FIG. 7 is a front view of a portion of the designated circular area of FIG. 6, shown in contact with electrically conductive material.

An example of a positive compression test with the detection plate 80 is shown in FIG. 7, in which a front view of a portion of the designated circular area of FIG. 6 is shown. Generally, two individual plates 82a, 82b of the first portion of the detection plate 80, and two individual plates 84a, 84b of the second portion of the detection plate 80 are shown. All individual plates of one set are electrically insulated from an adjacent plate of another set. As shown, a leak has occurred during compression of a flexible package (not shown, after passage of flexible package). One or more leaks in the tested flexible package have left remaining amounts of the electrically conductive contents in more than one location. An amount 86 spans over a portion of two adjacent plates 82b, 84a, as does an amount 88, which spans over adjacent plates 82b, 84b. An amount 90 spans a corner portion of four plates 82a, 82b, 84a, 84b. As a result of each of these amounts 86, 88, 90, a control system (not shown) detects an electrical current between the electrically conductive first portion of the detection plate 80 and the electrically conductive second portion of the detection plate 80. This test result is for example only, and other positive test results could occur with amounts of leaked material disposed at other locations on the detection plate.

Figure 8:
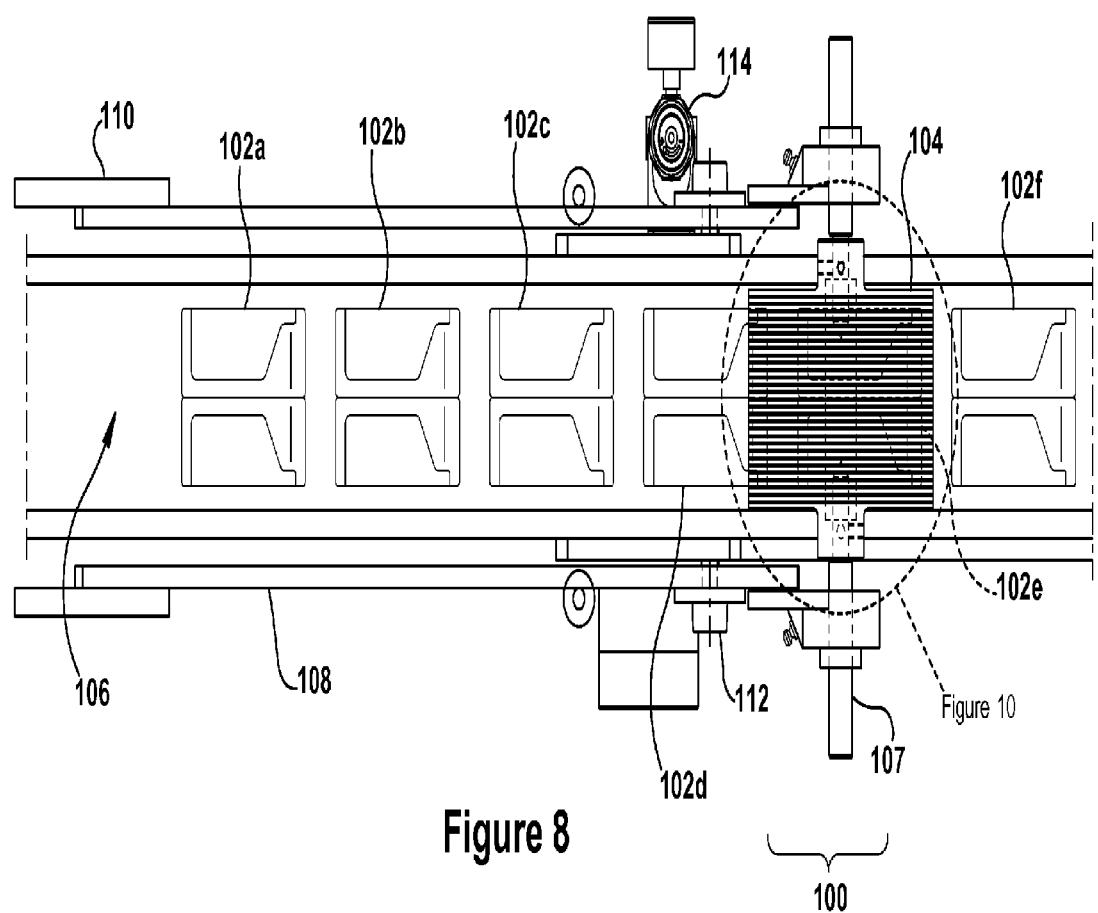
FIG. 8 is a top view of another exemplary leak detection device.

Another exemplary embodiment of a leak detection device is shown in FIG. 8. The device 100 includes several features common to device 10 of FIGS. 1-2, including a conveyor to move flexible packages toward a roller. As discussed herein, the conveyor can be of many styles, such as a cloth belt, plastic belt, or flexible chain. The conveyor transports flexible packages that contain electrically conductive materials, such as for example, liquids, pastes, gels or powders, to a detector head roller which is mounted above the conveyor. The detector head roller includes a series of round conductive and insulating plates that are stacked or laminated together to form a roller.

In the embodiment shown in FIG. 8-12, the stack of conductive and insulating plates are held together with conductive throughbolts, though the plates could be attached by other mechanical means, such as for example, adhesive, solder, or welding. The stacked plates are alternately stacked with "A" and "B" electrode plates (see FIG. 11), and all electrode plates are separated by insulator plates. The detector head roller is mounted on one or more pivot arms to allow it to roll on the surface of the moving conveyor, and then roll up on top of any flexible packages riding on the conveyor that approach the roller. A counterweight may be mounted on the alternate end of the pivot arms from the detector head roller to allow adjustments to the downward force provided by the detector head roller onto the flexible package. Additional force adjustment can also be provided by a power assist mechanism, such as for example, a pneumatic cylinder, hydraulic cylinder or electric solenoid. Additional force adjustment may also be provided with non-powered means, such as for example, springs, weights or magnets.

Referring again to FIG. 8, the device 100 is shown in a similar orientation, and with more detail than, the device 10 of FIGS. 1 and 2. A top view of the device 100 shows a series of flexible packages 102a, 102b, 102c, 102d, 102e, 102f resting upon the top surface 106 of a conveyor. A detector head roller 104 is mounted on a support shaft 107 above the conveyor. The support shaft 107 is held above the top surface 106 of the conveyor on a pivot arm 108, which has a counterweight 110 on the end opposite the detector head roller 104. The pivot arm 108 is able to rotate due to being mounted on a rotary pivot bearing 112. The detector head roller 104 and counterweight 110 are provided additional adjustability by having a powered pressure assist mechanism 114 on their connecting pivot arm.

Figure 9:
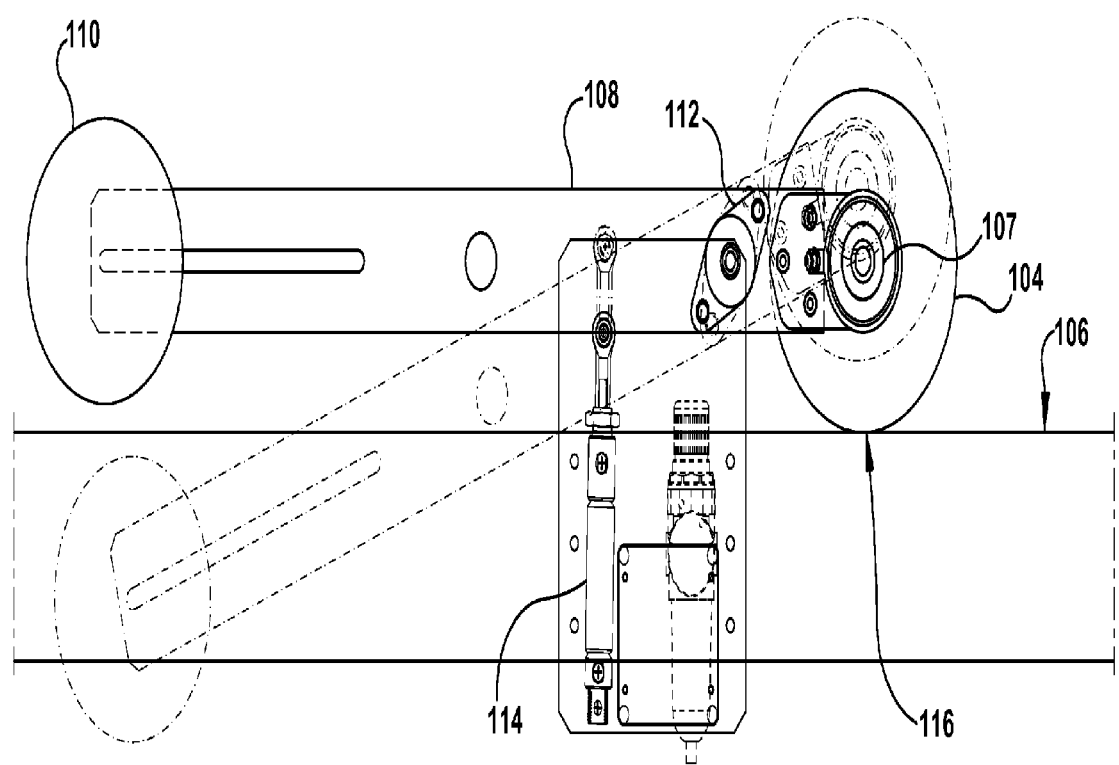
FIG. 9 is a side view of the device of FIG. 8.

FIG. 9 is a front elevation of the device of FIG. 8. The relationship of the counterweight 110 connected to the detector head roller 104 on the pivot arm 108, and the pivot arm 108 mounted on the pivot bearing 112, is easily seen. Also, the point of engagement 116 for the roller 104 and the package on the top surface 106 of the conveyor surface is easily understood.

In operation, a flexible package riding on the moving conveyor is brought to the point of engagement 116 of the roller and package. As the detector head roller 104 encounters the package, the conveyor will continue to drive the package forward, forcing it under the roller, and causing the roller to begin to ride up on to the flexible package. As the detector head roller begins to ride on the package, the force of the roller will increase the internal pressure in the package, stressing any weak points of the package, which will force the contents of the flexible package through the weak point or points of the package as demonstrated in FIG. 5c, for example. As the contents squeeze out of the package it will be rolled over by the detector head roller, depositing a portion of the electrically conductive material on the detector head roller. If the amount of the electrically conductive material spans across both an "A and "B" plate, it will cause a continuous circuit to be made between the "A" and "B" plates that can be easily detected and used to indicate a liquid leaking flexible package.

Figure 10:
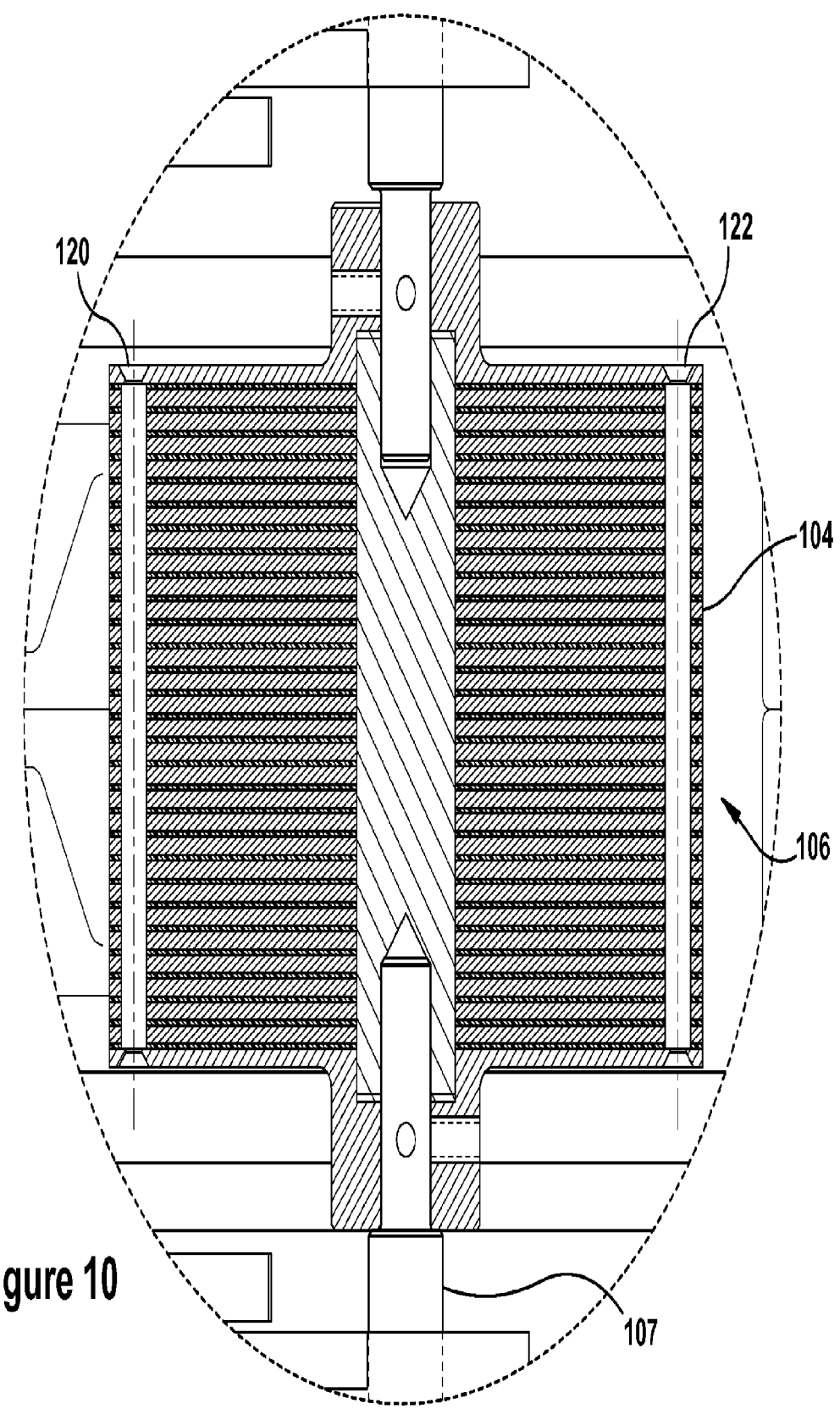
FIG. 10 is a section view of the designated circular area of FIG. 8.
Figure 11:
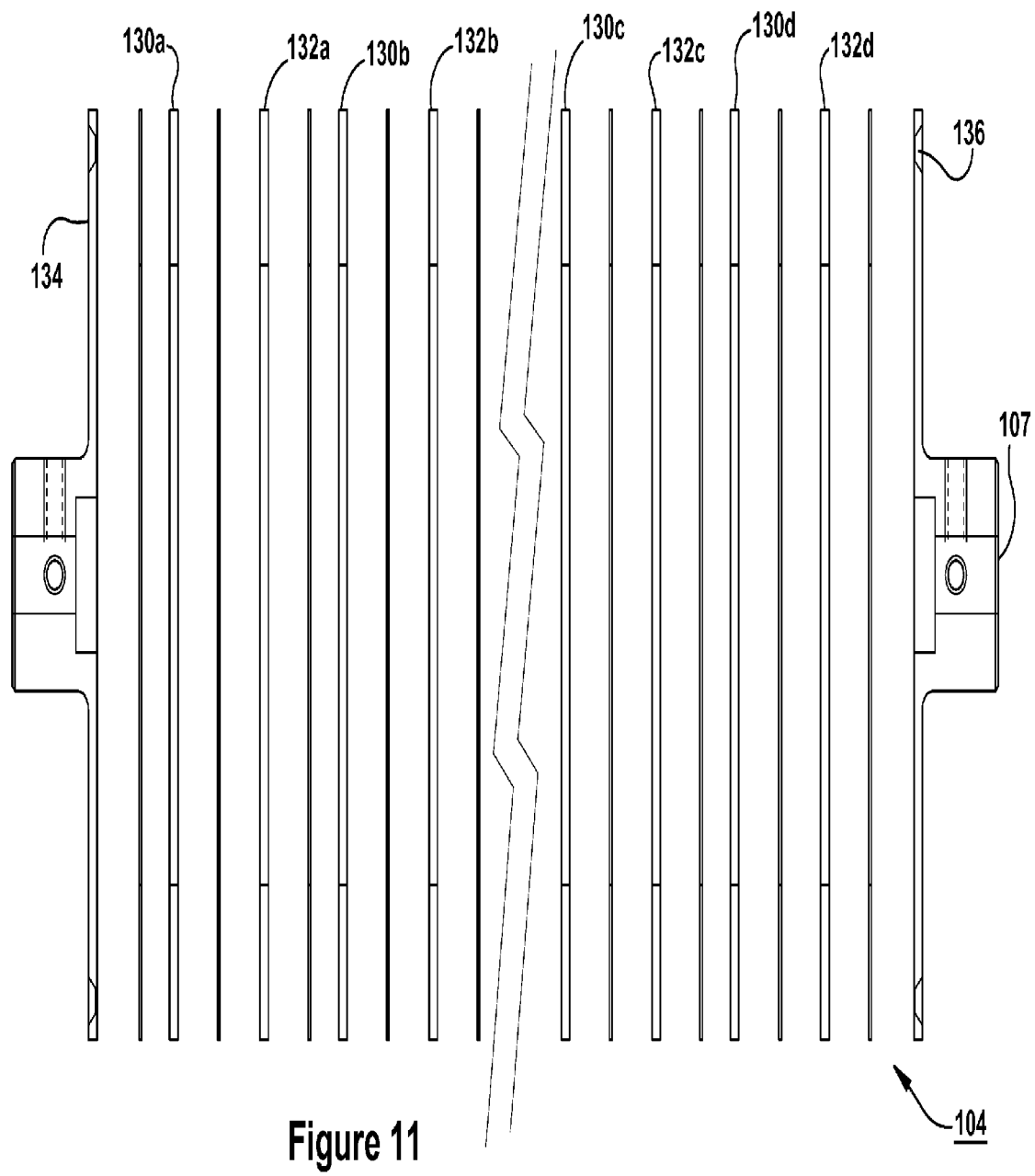
FIG. 11 is a top exploded view of the exemplary detection roller of FIG. 8.

FIG. 10 is a top view of the designated circular area of FIG. 8, and shows a sectional view of the detector head roller 104. Each plate in the roller has two or more holes 120, 122 holes for the bolts, which are alternately sized to be in contact with a throughbolt and to provide clearance to the throughbolt. FIG. 11 is a top exploded view of the exemplary detection roller of FIG. 8, and shows the details of the stack of conductor and insulator plates found in the detector head roller 104. A set of "Electrode A" plates 130a, 130b, 130c, 130d are electrically connected together, and a set of "Electrode B" plates 132a, 132b, 132c, 132d are electrically connected together, and with the roller physically connected, the "A" plates are electrically insulated from the "B" plates.

Discussed herein, the stack of plates is held together by bolts and the set of plates are electrically insulated by insulator plates placed between each electrode plate.

In this embodiment, the pressure head detector roller 104 is held together with multiple conductive throughbolts. The holes for the throughbolts are alternately sized such that one hole conductively touches the bolt, and then the next hole allows the bolt to pass through the hole with a sufficient clearance gap around. The "A" and "B" plates are assembled such that the conductive holes from the "A" plate line up with the clearance gap holes of the "B" plate, and that the conductive holes from the "B" plate line up with the clearance gap holes of the "A" plate. In other words, about half of the bolts holding the detector head roller 104 together will touch all of the "A" plates, but pass through all of the "B" plates with clearance. The other half of the bolts touch all of the "B" plates, but pass through all of the "A" plates with clearance. This arrangement allows all of the "A" plates to operate as an electrical unit, and all of the "B" plates to operate as an electrical unit. For example, all A" plates may be connected by a single "A" wire and all "B" plates may be connected by a single "B" wire. With all of the "A" plates connected and all of the "B" plates connected, only two electrical connections are required from the detector head roller 14, for example, at outer plates 134, 136, to the outside control system that will sense an electrical current between the "A" unit and the "B" unit that exists when a leak occurs. The two electrical connections are one to any "A" plate or "A" conductor throughbolt, and the other connection to any "B" plate or "B" conductor throughbolt. These two electrical connections to the detector head roller can be provided by many common rotary electrical pickup and transmission devices.

As discussed herein, once the control system recognizes electrical continuity between the two units that is indicative of a leak, the control system will then trigger an output response as determined appropriate by the user. For example, the output response may include one or more of triggering an alarm light, an audible warning, turning off the conveyor or firing a rejection system. The ability to detect small leaks is dependent on the distance between "A" and "B" plates, as well as the relative thickness of the plates, so the preferred leak detector would have very thin electrode plates and very thin insulators between the plates, although any suitable size may be used.

Another embodiment for a device for testing and detection of leaks in flexible packages may include a laminated plate of "A" and "B" conductors separated by insulators that intermittently push down onto a flexible package filled with a powder, liquid, gel or paste. This device would demonstrate intermittent motion, and may have particular use for slower speed or lab applications. The detector head may be mounted above a conveyor, a reciprocating surface, or a non-moving surface, and may push down when it senses a flexible package is in place or when an operator signals it to do so.

Figure 12:
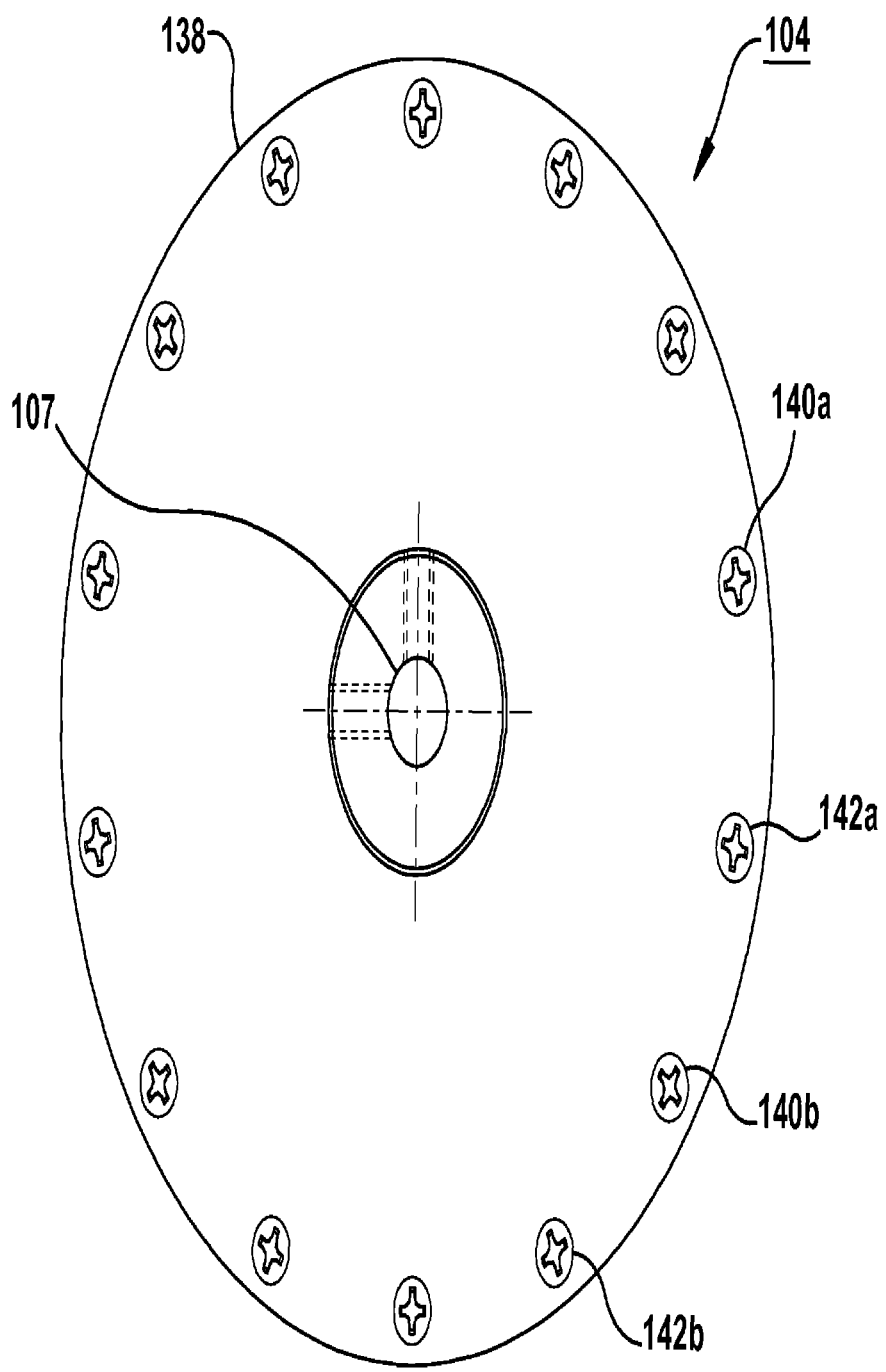
FIG. 12 is a side view of the exemplary detection roller of FIG. 8.

FIG. 12 is a side view of the exemplary detection roller of FIG. 8, showing an outside plate 138. In the center of the roller 104 is the support shaft 107, and around the perimeter of the outside plate 38 are the holes for throughbolts. Progressing around an exemplary portion of the perimeter of the plate 138, the holes are alternately sized to either be a hole 140a, 140b for contact with the throughbolt, i.e., a "hole sized for conduction," or a hole 142a, 142b for clearance with the throughbolt, i.e., a "hole sized for clearance."

A perspective view of another exemplary roller of a leak detection device is shown in FIG. 13a. Portions of the roller 160 are removed for clarity to show a series of conductor plates. The plates are arranged in an alternating pattern and longitudinally in a co-axial position with axis of the roller $X_1$. FIG. 13b shows a perspective front view of an exemplary conductor plate 162. The conductor plate 162 is cut with a tab 164 on one end, extending from an elongated body 166. A top surface 168 of each plate is exposed on the top surface of the roller 160. As positioned in the roller 160, each side surface 170 is insulated from an adjacent conductor plate on either side.

Referring again to FIG. 13a, the roller is constructed by a predetermined placement of conductor plates on a cylindrical cage frame 180. The frame may be secured in a co-axial positioned to a support shaft 182. As shown, the conductor plates are positioned to alternate the tab 164 left, and next the tab 164 right, as they are placed around the frame 180, with an insulation layer between each plate. For example, conductor "A" plate 184 is positioned with a tab to the right, and conductor "B" plate 186 is positioned with a tab to the left. A layer of insulation 188 electrically separates the plates 184, 186. In this orientation, the tabs on the right side of the wheel for the "A" plates can be easily electrically connected, as can all the tabs on the left side of the wheel for the "B" plates. For example, the tabs could be inside the frame 180, and a connecting wire may run around the inner circumference of the frame, or the tabs could be outside the frame, and a connecting wire may run around the outer circumference of the frame.

The alternating pattern shown in FIG. 13a can also be seen in the front partial assembly view shown in FIG. 14. A series of conductor plates 190a, 190b, 190c are shown in an alternating pattern with the tab 192a, 192b, 192c, respectively, disposed in an alternating position. A cooperatively shaped insulator 194 is positioned between each plate. A front view of the assembled roller 160, with the individual pieces of FIG. 14, is shown in FIG. 15.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, circuits, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A device for detecting leaks or weaknesses in a flexible package, the device comprising:
   a first member having a non-conductive and planar surface;
   a second member secured in a position adjacent the first member and having an electrically conductive first portion and an electrically conductive second portion; and
   a control system;
   wherein the electrically conductive first portion of the second member is normally electrically insulated from the electrically conductive second portion of second member, and the control system is arranged to detect an electrical current between the electrically conductive first portion and the electrically conductive second portion.

2. The device of claim 1 wherein the second member is positioned relative the first member to compress a flexible package between the first member and the second member.

3. The device of claim 2 wherein the second member rides upon the outer surface of the flexible package during passage of the flexible package past the first member.

4. The device of claim 2 wherein a force applied to the flexible package by the second member is adjustable by a pressure-assist mechanism.

5. The device of claim 1 wherein the flexible package contains an electrically conductive material.

6. The device of claim 5 wherein the electrical current between the electrically conductive first portion and the electrically conductive second portion flows through an electrically conductive material that has been forced out of the flexible package by compression between the first member and the second member.

7. The device of claim 1 wherein the second member is comprised of a first set of individual parts and a second set of individual parts, wherein the first set of individual parts is electrically insulated from the second set of individual parts.

8. The device of claim 1 wherein the second member is a roller.

9. The device of claim 8 wherein the roller comprises:
   a first set of electrically conductive plates;
   a second set of electrically conductive plates; and
   a set of insulating plates;
   wherein each of the first set of electrically conductive plates is electrically insulated from each of the second set of electrically conductive plates by at least one of the set of insulating plates.

10. The device of claim 9 wherein the plates are secured in a stack by connectors, wherein a first set of connectors electrically connects the first set of electrically conductive plates and a second set of connectors electrically connects the second set of electrically conductive plates.

11. The device of claim 8 further comprising a pivot arm having a counterweight mounted at one end and the roller rotatably mounted on an opposing end.

12. The device of claim 8 wherein the roller is counterbalanced against the force of gravity applied to the flexible package.

13. The device of claim 1 wherein the control system signals a user when the electrical current is detected between the first portion of the second member and the second portion of the second member.

14. The device of claim 1 wherein the non-conductive surface of the first member is moving during operation of the device.

15. The device of claim 1 wherein the first member is a conveyor having an insulated belt.

16. A device for detecting leaks or weaknesses in a flexible package, the device comprising:
   a conveyor having a non-conductive and planar surface;
   a roller having a pivot arm having a counterweight mounted at one end and the roller rotatably mounted on an opposing end, and secured in a position adjacent the non-conductive surface and having an electrically conductive first portion and an electrically conductive second portion; and
   a control system;
   wherein the electrically conductive first portion of the roller is normally electrically insulated from the electrically conductive second portion of roller, and the control system is arranged to detect an electrical current between the electrically conductive first portion and the electrically conductive second portion.

17. The device of claim 16 wherein the roller comprises:
   a first set of electrically conductive plates;
   a second set of electrically conductive plates; and
   a set of insulating plates;
   wherein each of the first set of electrically conductive plates is electrically insulated from each of the second set of electrically conductive plates by at least one of the set of insulating plates.

18. The device of claim 16 wherein the roller is positioned relative the non-conductive surface to compress a flexible package between the non-conductive surface and the roller.

19. The device of claim 16 wherein the roller rides upon the outer surface of the flexible package during passage of the flexible package past the non-conductive surface.

20. The device of claim 16 wherein the flexible package contains an electrically conductive material.

* * * * *